United States Patent
De Cock et al.

(10) Patent No.: US 7,358,312 B2
(45) Date of Patent: Apr. 15, 2008

(54) EPOXY RESIN CURING AGENT OF EPOXY RESIN-LIQUID AMINE ADDUCT AND POLYAMIDOAMINE

(75) Inventors: Christian Jean Charles De Cock, Ottignies Louvain-La-Neuve (BE); Pascale Charlotte Agnes Marie Ghislaine Claeys Bouuaert, Ottignies Louvai-La-Neuve (BE); Derek Scott Kincaid, Cranberry Township, PA (US); Karin Van Poppel, Ottignies Louvain-La-Neuve (BE); Dominique Elisabeth Marie Vandenberghe, Ottignies Louvain-La-Neuve (BE); Pen Chung Wang, Houston, TX (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 455 days.

(21) Appl. No.: 10/487,318

(22) PCT Filed: Aug. 21, 2002

(86) PCT No.: PCT/EP02/09482

§ 371 (c)(1), (2), (4) Date: Jul. 12, 2004

(87) PCT Pub. No.: WO03/020789

PCT Pub. Date: Mar. 13, 2003

(65) Prior Publication Data

US 2004/0242835 A1 Dec. 2, 2004

(30) Foreign Application Priority Data

Aug. 28, 2001 (EP) .................. 01203243

(51) Int. Cl.
*B32B 27/34* (2006.01)
*B32B 27/38* (2006.01)
*C08L 63/02* (2006.01)
*C08L 77/08* (2006.01)

(52) U.S. Cl. ............ 525/423; 428/413; 525/420.5

(58) Field of Classification Search .............. None
See application file for complete search history.

(56) References Cited

U.S. PATENT DOCUMENTS

| | | | | |
|---|---|---|---|---|
| 3,280,054 | A * | 10/1966 | Gotze et al. | 528/111.3 |
| 3,860,541 | A * | 1/1975 | Lehmann et al. | 525/523 |
| 3,870,666 | A | 3/1975 | Becker | |
| 4,051,195 | A * | 9/1977 | McWhorter | 528/106 |
| 4,246,148 | A | 1/1981 | Shimp et al. | |
| 4,418,166 | A * | 11/1983 | Chesney et al. | 523/400 |
| 4,636,411 | A * | 1/1987 | Dubois et al. | 427/314 |
| 4,803,232 | A * | 2/1989 | Shah | 523/456 |
| 5,319,004 | A * | 6/1994 | Marten et al. | 523/404 |
| 6,258,920 | B1 * | 7/2001 | Starner et al. | 528/113 |
| 6,451,876 | B1 * | 9/2002 | Koshy | 523/219 |

FOREIGN PATENT DOCUMENTS

| EP | 1 024 159 A | 8/2000 |
|---|---|---|
| JP | 3-275781 A | * 12/1991 |

OTHER PUBLICATIONS

Chemical abstracts registry No. 2210-79-9 for o-cresyl glycidyl ether, 1999.*
Chemical abstracts registry No. 4162-78-1 for 2,4,6-tris[(diethylamino)methyl]phenol, 2001.*

* cited by examiner

Primary Examiner—Robert Sellers

(57) ABSTRACT

This invention describes epoxy-amine compositions that have low mix viscosity and a fast drying property at temperatures below freezing.

The composition is useful for high solids coating applications, for adhesive and membrane applications, and for preparing impregnated substrates.

10 Claims, No Drawings

EPOXY RESIN CURING AGENT OF EPOXY RESIN-LIQUID AMINE ADDUCT AND POLYAMIDOAMINE

The invention relates to a low viscosity curing agents composition for epoxy resin systems for low temperature cure applications derived from amines.

There has long been a desire to formulate a curing agent which has simultaneously a low viscosity and could be formulated with epoxy resins over a wide range of temperature. Conventional amine curing agents with low viscosity have often primary amine groups, which, when stored or used at low temperature curing conditions or in high humidity environments, produce a final cured product with the undesired side effect of blooming or hazing. This phenomena is resulting from the reaction of the primary amine group and carbon dioxide/moisture present in air to produce carbamate.

A technical solution to prevent the carbamate formation has been found by the use of either epoxy-amine adducts or polyamidoamides, which curing agents have the property to be less reactive with carbon dioxide, mainly due to the reduced concentration of the primary amines. The drawbacks of those curing agents are that they have a higher viscosity and a lower reactivity at low temperature, which will not enable the epoxy paint formulator to use these products in a high solids formulation for low temperature application.

Epoxy resin compositions which are curable at low temperature and high humidity comprising an amine curing compound and optionally a cure accelerator are known from EP 0253 339 B1 which discloses an epoxy resin composition, comprising an epoxy resin an amine curing compound, a cyclic carbonate and optionally an accelerating compound and/or other additives. However, the compositions of EP 0253 339 B1 have several disadvantages. Firstly the incorporation of urethane structures in the cured epoxy amine matrix is not beneficial to the chemical resistance of the cured resin matrix. Secondly the reported cure temperatures of the compositions are not lower than 5° C.

Additional reactive epoxy resin compositions were known from EP 0 601 668A1, which actually disclosed an ambient and low temperature curable epoxy resin composition comprising an epoxy resin, an amine curing compound and an accelerator. In the said composition the accelerator is a beta, gamma-dihydroxyamine. The preferred amine curing compounds are the mannich bases for cure temperatures lower than 10° C. Suitable mannich bases are for example those mentioned in U.S. Pat. No. 4,269,742, which can be prepared according to methods know in the art. The disadvantage of this epoxy resin composition is that high level of accelerator is needed to allow a good cure response at temperature of 2° C. and even with this level of accelerator the epoxy resin composition claimed in EP 0 601 668 is not fast enough to be cured at temperature below zero.

Therefore, it would be desirable to have a curing agent that shows a low viscosity at lower temperature and that could be formulated in a fast reacting system at such low temperature.

As a result of extensive research and experimentation, said curing agents aimed at, have surprisingly been found now. The invention is relating to epoxy-amine compositions that have low mix viscosity and a fast drying property at temperatures below freezing. The composition is useful for high solids coating applications on shaped carriers such as wood or polymers, for adhesive and membrane applications, and for preparing impregnated substrates.

Accordingly, the present invention, provides a low viscosity curing composition for low temperature cure of epoxy resins, comprising:

(a) an amine adduct of an epoxy resin having at least 1.5 epoxy groups per molecule, and a liquid amine (b) a liquid polyamidoamine prepared by reacting a long-chain carboxylic acid and a liquid amine and which polyamidoamine is further reacted with an epoxy functional resin and a monoglycidyl ether or ester.

It will be appreciated that amines to be used as starting reactants for components (a) and (b) may be the same or different and may be selected from a great variety of amines. Said amines are preferably selected from cycloaliphatic amines or aliphatic amines or alkylaromatic amines, wherein the hydrocarbyl backbone contains of from 2 to 20 carbon atoms and preferably from 3 to 16 carbon atoms.

As starting amine for components (a) and (b) preferably cycloaliphatic or aliphatic diamines containing from 6 to 16 carbon atoms and either two primary amino groups or one primary and one secondary amino group, are used. More preferably mixtures of these two types of amines are used with a minor weight proportion of a diamine, containing one primary and one secondary amino group. With the term "minor weight proportion" is meant that weight proportions of less than 40 wt %, and preferably less than 20 wt % and more preferably less than 10 wt %, relative to the total weight of amines, are used.

Most preferably amines are selected from 1,2-propylene diamine; 1,3-propylene diamine; tetramethylene diamine; hexamethylene diamine; 2,2,4-trimethylhexamethylene diamine; 1,3-diaminomethylbenzene; N,N,N',N'-tetramethyl-1,6-diaminohexane, isophoron diamine; 2,4,4-trimethylhexamethylene diamine; polyalkylene polyamines, such as triethylenetetramine or tetraethylene pentamine; N-hydroxyethylalkylene polyamines, such as N-hydroxyethyl diethylenetriamine; methaxylene diamine; 4,4'-bis(aminocyclohexane); 1,3,6-triaminoethyl hexane, or amines of the formulae:

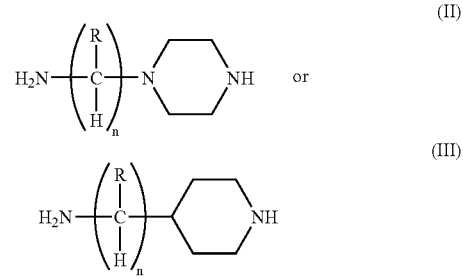

wherein n is an integer in the range of from 1 to 6 and preferably from 1 to 3 and wherein the R symbols may be the same or different when n>1 and may represent hydrogen or alkyl of from 1 to 3 carbon atoms and preferably methyl, if any.

More preferred are those amines according to formula II, wherein n=2 and all R groups are hydrogen i.e. aminoethyl piperazine, or mixtures of said amines.

Preferred amines to be used for the preparation of the polyamidoamine adduct components (b) are triethylene tetramine (TETA), 1,4-diaminocyclohexane, 4,4'-bis(aminocyclohexane) (PACM), and methaxylene diamine (MXDA), and amines of the formula II, wherein all groups R are hydrogen, or mixtures of said amines. Most preferred is triethylene tetramine (TETA).

The liquid curing agent according to the present invention typically are characterized by a number average molecular weight in the range of from 40 to 3000 preferably from 500 to 2500, and more preferably from 700 to 2000, whereas the Mw/Mn ratio is in the range of from 1 to 2.

It will be appreciated that the components (a) and (b) can also be formed in situ from the starting amines, epoxy resins and long chain carboxylic acid and monoglycidyl ether or ester. Accordingly to the present invention also relates to curing agent composition comprising:

a) an amine, selected from cycloaliphatic amines, aliphatic amines and alkylaromatic amines, wherein the hydrocarbyl backbone contains from 2 to 20 carbon atoms.
b) substituted alkyl amidopolyamide prepared from a) and a long-chain monocarboxylic acid which is a monocarboxylic acid having from 6 to 50 carbon atoms, or a long-chain dicarboxylic acid having from 18 to 60 carbon atoms.
c) an epoxy resin derived from polyglycidyl ethers of polyhydric phenols, and
a mono functional epoxy ether or ester, which is linear or branched having from 4 to 36 carbon atoms It will be appreciated that the curing agent compositions of the present invention show an attractive low viscosity as compared to those of prior art compositions, i.e. the present curing agents have a viscosity in the range of from 5 to 15 Pa·s, which enable low viscosities in the final coating mixtures comprising epoxy resins at low application temperatures, i.e. viscosities in the range of from 0.1 to 20 Pa·s preferably from 0.4 to 15 Pa·s.

Generally the reaction is carried out at a temperature gradually climbing to a level of above 200° C., preferably at a final temperature within the range of from 220° C. to 260° C. for a time effective to produce a liquid reaction product, followed by distillation, preferably under vacuum, to remove excess un-reacted amine, as well as water and/or alcohol reaction product. (The water or alcohol reaction product generally distils at atmospheric pressure before vacuum is applied.) The term "liquid" as used throughout the present specicification, refers to compositions which have a melting point, or ring and ball softening point (ASTM E28-67) of below room temperature (typically 25° C.). These liquid amine terminated polyamines are low molecular weight oligomers, typically having number average molecular weight within the range from 400 to 3000, preferably from 500, to 2500 and more preferably from 700 to 2000. Alternatively, the amine may be reacted with a chloride of the mono or dicarboxylic acid, but this synthetic procedure is less desirable because of the by products produced and the cost of the acid chlorides.

Preferably the long-chain monocarboxylic acid is monocarboxylic acid having from 6 to 50 carbon atoms. More preferably, the long-chain from 12 to 36 carbon atoms.

Preferably the long-chain dicarboxylic acid is a dicarboxylic acid having from 18 to 60 carbon atoms. More preferably, the long-chain dicarboxylic acid has from 30 to 55 carbon atoms.

As used herein, "dimer acids" refers to oligomeric fatty acids typically made from addition polymerisation, using heat and a catalyst, of unsaturated fatty acids, particularly tall oil fatty acids. These oligomeric fatty acids typically have the composition of from 5 up to 25% of $C_{18}$ monobasic acids, from 45 to 95% of $C_{36}$ dibasic acids, and about 1 to 35% of $C_{54}$ tribasic and higher polymeric acids. The relative ratios of monomer, dimer, trimer and higher polymer in unfractionated dimer acid are dependent on the nature of the starting material and the conditions of polymerisation and distillation. Methods for the polymerisation of unsaturated fatty acids are described, for example, in U.S. Pat. No. 3,157,681.

Examples of the "adduct acids" include adducts of acrylic acid, methacrylic acid, crotonic acid, etc. with linoleic acid, soybean oil fatty acid, tall oil fatty acid, etc. These adducts are normally prepared by thermal reaction at temperatures ≧200° C. Methods for the preparation of these adduct acids are described, for example, in U.S. Pat. No. 3,753,968.

An accelerator can be included to increase the cure rate of the epoxy resin-curing agent system. Various amine-compatible accelerators can be used as long as they are soluble in the amine curing agents. Examples of accelerators include metal salts such as, for example, sulfonates, phosphonates, sulfates, tetrafluoroborates, carboxylates and nitrates of Groups IA, IIA and transition metal series of the Periodic Table (CAS version), preferably Mg, Ca, Zn and Sn salts, and complexes thereof; inorganic acids such as, for example, $HBF_4$, $H_2SO_4$, $H_2NSO_3H$ and $H_3PO_4$; carboxylic acids, preferably hydroxy-substituted carboxylic acids such as, for example, salicylic, lactic, glycolic and resorcylic; phenolic compounds such as, for example, phenol, t-butylphenol, nonylphenol and bisphenol A; imidazoles; cyanamide compounds such as dicyandiamide and cyanamide; sulfonamides such as, for example p-toluenesulfonamide, methanesulfonamide, N-methylbenzenesulfonamide and sulfamide; and imides such as, for example, phthalimide, succinimide, perylenetetracarboxylic diimide and saccharin.

More preferable accelerators for the composition of the present invention include, for example, salicylic, lactic, glycolic and resorcylic acid; phenolic compounds such as, for example, phenol, t-butylphenol, nonylphenol and bisphenol A or an amino phenol derivative such as, for example, (2,4,6-tris(dimethyaminomethyl)phenol) (available as EPIKURE 3253 ex. Resolution Performance Products).

Epoxy compatible accelerators for the epoxy-amine reaction may be used as long that they are soluble in the epoxy resin part of the formulation. The most preferable product contains an acrylic ester group, wherein the acrylic functionality has to be at least more than two. The acrylic ester may derive from an aryl epoxy resin or from an aliphatic polyol. The polyacrylate and polymethacrylate ester of polyols useful in this invention are those esters which contain more than one terminal acrylate or methacrylate group. These esters are the acrylic or methacrylic acid esters of aliphatic polyhydric alcohols such as the polyacrylates and polymethacrylates of alkyne polyols, alicyclic polyols and higher polyols such as trimethylolethane, trimethylolpropane, pentaerythritol, dipentaerythritol, tripentaerythritol and mixture thereof. Such acrylate esters include, for example trimethylolpropane triacrylate, trimethylolethane triacrylate, trimethylolpropane trimethacrylate, and pentaerythritol tetraacrylate and dipentaerythritol pentaacrylate. The preferred acrylate for this invention composition is trimethylolpropane triacrylate or a blend of polyacrylate and epoxy resins such as EPON 8111 (ex Resolution Performance Products)

The epoxy resin constituent (c) can be any epoxy resin which can be cured by the amine terminated polyamine curing agent. Generally, said epoxy resin can be any curable epoxy resin having a 1,2-epoxy equivalency greater than one and preferably, on the average, more than 1.5 epoxy groups per molecule. The epoxy resin can be saturated or unsaturated, linear or branched, aliphatic, cycloaliphatic, aromatic or heterocyclic, and may bear substituents which do not materially/chemically interfere with the curing reaction. The epoxy resin may be monomeric or polymeric, liquid or solid, but is preferably liquid at room temperature. Suitable epoxy resins include glycidyl ethers prepared by reacting epichlorohydrin with a compound containing at least one, preferably two or more, hydroxyl groups carried out under alkaline reaction conditions. Examples of epoxy resins suitable for use in the invention include polyglycidyl ethers of polyhydric phenols, epoxy novolacs or similar glycidated polyphenolic resins, polyglycidyl ethers of glycols or polyglycols, and polyglycidyl esters of polycarboxylic acids.

The preferred epoxy resin is a resin based on a polyglycidyl ether of a polyhydric phenol for coatings, including cathodic electrodeposition, applications (other than highly ultraviolet-resistant topcoats, for which an aliphatic epoxy resin is preferred). Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A); 2,2-bis(4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable polyhydric phenols can also be obtained from the reaction of phenol with aldehydes such as formaldehyde (bisphenol-F) or non symetrical ketones. Fusion products of these polyglycidyl ethers of polyhydric phenols with phenolic compounds such as bisphenol-A are also suitable as epoxy resins, such as those described in U.S. Pat. Nos. 3,477,990 and 4,734,468. Commercial examples of preferred epoxy resins include, for example, EPON Resins 862, 828, 826, 825 and 1001 (EPON is a trade mark).

Modified epoxy resin specially for high solids paint formulations such as EPIKOTE 874-X-90, EPIKOTE 255-X-90 (EPIKOTE is a trade mark)

It will be appreciated that another feature of the invention is formed by complete ready for use epoxy resin compositions, comprising the herein before specified curing agent and an epoxy resin, and such compositions in cured state applied on a carrier.

The preferred epoxy resin systems of the invention contain one or more epoxy resins, a curing agent containing the amine terminated polyamine, and optionally an accelerator. The epoxy resin can be blended or mixed with the curing agent-containing the amine terminated polyamine and optionally the accelerator simultaneously.

Further to facilitate handling or application or use in various environments, the curing agent or the epoxy resin system can be diluted with minor amounts of solvent.

The curable epoxy resin composition can be cured at a temperature within the range of from −40° C., preferably from −10° C., to 100° C., preferably to 75° C., for a time effective to cure the epoxy resin. For standard coating applications the composition is preferably cured at a temperature from −10° C. to 75° C. For secondary containment membrane applications, the cure temperature is almost always the ambient temperature.

The epoxy resin composition of the invention may include other additives, such as flow control additives such as solvents or anti-sag agents, as well as other additives such as pigments, reinforcing agents, fillers, elastomers, stabilisers, extenders, plasticisers, and flame retardant depending on the application. The epoxy resin composition is useful for coatings, as adhesives, and for sizing or impregnating substrates such as sheets, cords, yarns and prepregs for various applications.

For coating applications, the curable epoxy resin composition can also contain pigments of the conventional type such as iron oxides, strontium chromate, carbon black, titanium dioxide, talc, barium sulfate, phthalocyanine blue and green, cadmium red, chrome green, lead silicate, silica, silicates and the like. Such pigments can be added to the polyamine curing agent component or the epoxy resin component prior to mixing them together. However, iron blue pigment, calcium carbonate and pigments considered reactive because of their basic nature are not compatible in the epoxy resin coating system when used in appreciable quantities. These normally are added to the curing agent component only. Defoamers, tints, slip agents, thixotropes, etc., are common auxiliary components to most coatings and may be employed in the epoxy resin composition of the present invention.

The curable coating composition can be applied to a substrate by brush, spray, or rollers. One of the advantages of the coating system of the invention is the lower solvent content (i.e., less than about 25%) of the curable coating composition.

The present invention will be further demonstrated by the following examples which are included for illustrative purposes only and are in no way meant to limit the present invention.

Examples 1-5 relating to the synthesis of curatives.

EXAMPLE 1

This example illustrates the synthesis of the substituted aryl amidopolyamine compound based on tall oil fatty acid (TOFA) and triethylene tetramine, which is subsequently reacted with a polyglycidyl ether and a monoglycidyl ether.

A 4 necked round-bottomed glass flask is equipped with a condenser having a water trap, a nitrogen inlet, an acid inlet, and the TETA inlet. The flask is flushed with nitrogen. 644.8 g of TOFA is charged to the flask, after which a total of 355.2 grams of TETA is charged. The amount of TOFA and TETA added are reacted in a ratio of one amine equivalent to one acid equivalent, or a 1:1 mole ratio. During the course of the reaction through completion, approximately 50 grams of water is distilled off. In this reaction scheme, the total amount of ingredients are mixed together prior to reaction.

After addition of the TOFA into the flask, TETA is added at about 23° C. initial, with the contents of the flask being stirred under a nitrogen pad, for a period of two hours, during which the exotherm raised the temperature of the reaction mixture to 50° C. Once addition of the TETA is complete, the temperature of the reactants in the flask is raised to 150° C. slowly over a 55 minutes period, and then raised to 260° C. Hold the temperature until the 50 grams of water has been collected. Take a sample for analysis. The amine value must be 370-390 mg/KOH.

Once this product is made, the temperature is decreased to 60° C. When reached, add 60 g of pine oil maintain the temperature around 50° C., agitate for 30 minutes. Add 95 grams of ethanol and adjust the temperature to 60° C. Charge slowly 20 g of monoglycidyl ether HELOXY® 62 and 180 grams of EPIKOTE 828. The exotherm is controlled by applying cooling and/or slowing down the addition rate. The temperature may preferably not exceed 70° C., upon completion maintain the batch temperature at 60-65° C. for 2-hour. The amine value of the final end capped amidopolyamine product is measured to be 250 mg KOH/g.

EXAMPLE 2

This example illustrates the synthesis of the epoxy amine adduct that is used as curative for epoxy.

210.4 grams of EPIKOTE 154, which is a phenol novolac based epoxy resin available from Resolution Performance Products, 548.9 grams of TETA is used as feedstock for the first reaction step. TETA is charged in the reactor and heat to 65-70° C., before addition of EPIKOTE 154, control of reaction temperature is critical. The maximum temperature is 100° C. After complete addition of EPIKOTE 154 the temperature is hold for one hour at 100-101° C. The excess of TETA is recovered by application of vacuum (1.5 mmHg) and the batch temperature is raised to 232° C., when finished the product have an amine value of 630 mg KOH/g. The batch is then cooled to 120° C. with nitrogen blanket, when the temperature is reached, and 100 grams of n-butanol are added; whereafter the batch is further cooled to 87-93° C. then HELOXY® 62 (206.6 g) are added, the temperature is controlled in such away, that it is not exceeding 110° C. When completed the temperature is lowered to 93° C. and 300 grams of xylene are added. The measured amine value based on solids is 405 mg KOH/g. The solids content has to be between 59 and 61% wt if not then is adjusted with a blend of xylene/butanol (3/1)

EXAMPLE 3

The curative made according to the process of Example 1 and the curative made according to Example 2 are blended in a weight ratio of (1/1.5 wt/wt) this result in a curing agent with a hydrogen equivalent weight (HEW of 140 g/mol on solids), the solids content is around 60% the viscosity is reported in table 1.

TABLE 1

| Example | viscosity* | HEW (g/mol, as supplied) | mix viscosity** |
|---|---|---|---|
| 1 | 194 | 170 | 34.60 |
| 2 | 420 | 230 | 54.00 |
| 3 | 8.9 | 257 | 12.50 |

*Brookfield viscosity in Pa · s at −5° C. spindle: 2
**mix viscosity when combined with stoechiometric amount of EPIKOTE 828/EPON 8111 (weight ratio 8/2) at −5° C.

Examples 1 and 2 can be seen as comparatives, the example 3 shows surprisingly that the initial and the mix viscosity are lower so this example is seen as part of the invention.

EXAMPLE 4

This example illustrates the synthesis of the curing agent composition made according to insitu process or the "one pot" operation. The substituted aryl amidopolyamine compound based on tall oil fatty acid (TOFA) and triethylene tetramine, which is subsequently reacted with a polyglycidyl ether and a monoglycidyl ester (Cardura E 10P).

The reactor is set has in example 1. 194.1 grams of TOFA is charged to the flask, after which a total of 106.6 grams of TETA is charged. The amount of TOFA and TETA added are reacted in a ratio of one amine equivalent to one acid equivalent, or a 1:1 mole ratio. During the course of the reaction through completion, approximately 15 grams of water is distilled off.

After addition of the TOFA into the flask, TETA is added at about 23° C. initial, with the contents of the flask being stirred under a nitrogen pad, for a period of two hours, during which the exotherm raised the temperature of the reaction mixture to 50° C. Once addition of the TETA is complete, the temperature of the reactants in the flask is raised to 150° C. slowly over a 55 minutes period, and then raised to 260° C. Hold the temperature until the 15 grams of water has been collected. Once this product is made, the temperature is decreased to 60° C. When reached, add slowly 8.2 g of monoglycidyl ether HELOXY® 62 and 85.8 grams of EPIKOTE 828. The exotherm is controlled by applying cooling and/or slowing down the addition rate. The temperature may preferably not exceed 70° C., upon completion maintain the batch temperature at 60-65° C. for 2-hour. After this period 322.7 grams of TETA are added at a temperature of 70° C., after completion 125.6 grams of EPIKOTE 154 is added slowly. The temperature is controlled in order to stay between 70 and 90 with as maximum temperature 100° C. After complete addition the temperature is raised to 100° C. and kept for one hour. After that period the excess of TETA is recovered by vacuum distillation at 230° C. with a vacuum of 30 mmm Hg, (the inside temperature may not exceed 240° C.) the total recovery is 208.8 grams of TETA. The temperature is decreased to 80° C. when reach, 161.5 grams of Cardura E 10 P is add slowly (over a period of two hours) the exotherm is controlled such that the batch temperature does not exceed 110° C. 19.1 grams of EPIKURE 3253 is added at 70° C. before dilution with xylene (129.0 g), n-butanol (42.9 g) and ethanol (28.4 g). The properties of the product are given in table 2.

EXAMPLE 5

This example illustrates the synthesis of the curing agent composition made according to in-situ process or the "one pot" operation. The substituted aryl amidopolyamine compound based on tall oil fatty acid (TOFA) and triethylene tetramine, which is subsequently reacted with a polyglycidyl ether and a monoglycidyl ether (Heloxy 62). The same process description as in example 4 wherein Cardura E 10P is replaced by 149.4 grams of Heloxy 62. The properties of the product are given in table 2.

TABLE 2

| Example | Viscosity*/ solid contents | HEW (g/mol, as supplied) | mix viscosity** |
|---|---|---|---|
| 3 | 33/80% | 170 | 1.21 |
| 4 | 17/83% | 173 | 0.55 |
| 5 | 25.7/80% | 174 | 0.72 |

*Brookfield viscosity in Pa · s at 23° C. spindle: 4
**mix viscosity when combined with stoechiometric amount of EPIKOTE 828 at 23° C. (solid content 78%), spindle 2

EXAMPLES 6 TO 9

Formulations and Coating Properties

The curing agents prepared as in examples 3 to 5 exhibit in combination with EPIKOTE 828/EPON 8111 similar coating performance as EPIKURE 3292-FX-60 (ex Resolution Performance Products) which is used as comparative for coating properties. However the formulation based on examples 3 to 5 curatives lead to very attractive low mix viscosity and faster drying time in combination with EPIKOTE 828/EPON 8111, formulation of examples 7 to 9.

The formulations are prepared by blending the epoxy resins and the curing agent. The products are stored at −5° C. prior to the blending. After manually mixing for 5 minutes to allow homogeneous systems to be prepared, the formulations are put back at −5° C.

| Example | Curative | epoxy |
| --- | --- | --- |
| 6 | EK3292-FX-60 | E828/Epon 8111* |
| 7 | Example 3 | E828/Epon 8111* |
| 8 | Example 4 | E828/Epon 8111* |
| 9 | Example 5 | E828/Epon 8111* |

*ratio 8/2 on weight

Experimental Conditions:

Clear coats at −5° C.: application of 120 μm wet film thickness, on glass and QD panels. 7 days cure at −5° C. and then conditioned one hour at room temperature prior to testing.

Reactivity at −5° C.:

|  | hard gel, in hours | mar resistance, in hours |
| --- | --- | --- |
| Example 6 | 2:52 | >24 |
| Example 7 | 3:15 | 18 |
| Example 8 | 3:30 | >24 |
| Example 9 | 4:15 | >24 |

Coating properties: Adhesion, hardness, flexibility and appearance are similar for both systems, however it at been seen that the hardness of example 5 based coating is higher.

At room temperature the potlife and reactivity have been measured for two formulation based on the curatives of this invention:

| Curative | Time |
| --- | --- |
| Potlife (according to the Tecam test at 23° C.) blend EPIKOTE 828/EPON 8111 and curative | |
| EPIKURE 3292-FX-60 | 31 minutes |
| Example 3 | 42 minutes |
| Potlife (according to the Tecam test at 23° C.) blend EPIKOTE 828 and curative | |
| EPIKURE 3292-FX-60 | 84 minutes |
| Example 3 | 140 minutes |
| Example 4 | 233 minutes |
| Example 5 | 213 minutes |

The invention claimed is:

1. A low viscosity curing agent composition for low temperature cure of epoxy resin compositions comprising a blend of: (a)(i) an amine adduct of an epoxy resin having at least 1.5 epoxy groups per molecule and (a)(ii) a liquid amine and (b) a liquid polyamidoamine prepared by reacting a long-chain carboxylic acid and an amine wherein the polyamidoamine is further reacted with an epoxy functional resin and a monoglycidyl ether or ester;

wherein the liquid amine is selected from the group consisting of cycloaliphatic, aliphatic and alkylaromatic polyamines.

2. The low viscosity curing composition of claim 1, wherein the liquid amine used for reaction product (a) is selected from the group consisting of cycloaliphatic amines, aliphatic amines and alkylaromatic amines, having a hydrocarbyl backbone containing from 2 to 20 carbon atoms.

3. The low viscosity curing composition of claim 2 wherein the liquid amine used for reaction product (a) is a cycloaliphatic or aliphatic diamine containing from 6 to 16 carbon atoms and having either two primary amino groups or one primary and one secondary amino group.

4. The curing agent composition according to claim 3, wherein the liquid amine is a mixture of amines wherein one amine comprises two primary amino groups and wherein another amine comprises one primary and one secondary amino group.

5. The curing agent composition according to claim 1, wherein the curing agent is prepared in-situ from:
a) an amine, selected from the group consisting of cycloaliphatic amines, aliphatic amines and alkylaromatic amines having a hydrocarbyl backbone containing from 2 to 20 carbon atoms;
b) a substituted alkyl amidopolyamide prepared from a) and a long-chain monocarboxylic acid having from 6 to 50 carbon atoms, or a long-chain dicarboxylic acid having from 18 to 60 carbon atoms;
c) an epoxy resin derived from polyglycidyl ethers of polyhydric phenols; and
d) a mono functional epoxy ether or ester, linear or branched having from 4 to 36 carbon atoms.

6. A formulation to be used at low temperature containing the curing agent of claim 1, an accelerator compatible with the curing agent derived from mineral or organic acids or salts, from phenol derivatives or a combination thereof, and an epoxy compatible accelerator derived from a product containing an acrylic ester group wherein the acrylic functionality is more than two.

7. The formulation of claim 6, wherein the epoxy compatible accelerator comprises a blend of polyacrylate and an epoxy resin having a 1,2-epoxy equivalency greater than one epoxy group per molecule wherein the epoxy resin is saturated or unsaturated, linear or branched, aliphatic, cycloaliphatic, aromatic or heterocylic, and optionally has substituents which do not materially interfere with the curing reaction.

8. The formulation of claim 6, wherein the epoxy compatible accelerator is an acrylic ester derived from an aryl.

9. A cured coating film comprising the formulation of claim 7 wherein the film is applied on a shaped carrier.

10. The cured coating film according to claim 9 wherein the shaped carrier is comprised of wood or polymers.

* * * * *